(12) United States Patent
Worfolk et al.

(10) Patent No.: US 7,233,574 B2
(45) Date of Patent: Jun. 19, 2007

(54) MULTI-PATH DYNAMIC ROUTING ALGORITHM

(75) Inventors: Patrick A. Worfolk, Campbell, CA (US); Serge Plotkin, Palo Alto, CA (US); Shmuel Ravid-Rabinovitz, Jerusalem (IL); Itai Aaronson, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 10/056,178

(22) Filed: Jan. 22, 2002

(65) Prior Publication Data

US 2003/0128687 A1 Jul. 10, 2003

Related U.S. Application Data

(63) Continuation-in-part of application No. 09/589,631, filed on Jun. 7, 2000, now abandoned.

(51) Int. Cl.
*H04L 12/28* (2006.01)
(52) U.S. Cl. ............... 370/238; 370/252; 370/254; 370/351
(58) Field of Classification Search ............. 370/396, 370/409
See application file for complete search history.

(56) References Cited

U.S. PATENT DOCUMENTS

| | | | |
|---|---|---|---|
| 4,905,233 A * | 2/1990 | Cain et al. ............... 370/237 |
| 5,253,248 A | 10/1993 | Dravida et al. ............... 370/16 |
| 5,367,523 A | 11/1994 | Chang et al. ............... 370/84 |
| 5,377,327 A | 12/1994 | Jain et al. ............... 395/200 |
| 5,491,801 A | 2/1996 | Jain et al. ............... 395/200.13 |
| 5,596,719 A * | 1/1997 | Ramakrishnan et al. .... 709/241 |
| 5,668,951 A | 9/1997 | Jain et al. ............... 395/200.65 |
| 5,901,138 A | 5/1999 | Bader et al. ............... 370/229 |
| 5,940,396 A | 8/1999 | Rochberger ............... 370/408 |
| 6,301,244 B1 * | 10/2001 | Huang et al. ............... 370/351 |
| 6,456,599 B1 * | 9/2002 | Elliott ............... 370/254 |
| 6,621,795 B1 * | 9/2003 | Redi et al. ............... 370/235 |

OTHER PUBLICATIONS

Z. Haas, "Adaptive Admission Congestion Control", *ACM SIGCOMM*, Computer Communications Review, vol. 21, No. 5, pp. 58-76, Oct. 1991.

Meyerson, A. et al.: Cost-Distance Routing: Two Metric Network Design; IEEE; Dec. 31, 2000; pp. 624-630.

Awerbuch, B. et al.: Online Algorithms for Selective Multicast and Maximal Dense Trees; Automatic Computing Machinery; Feb. 25, 2997; pp. 354-362.

* cited by examiner

*Primary Examiner*—Huy D. Vu
*Assistant Examiner*—Roberta A Shand
(74) *Attorney, Agent, or Firm*—Blakely, Sokoloff, Taylor & Zafman LLP

(57) ABSTRACT

Disclosed is a routing algorithm that uses a new concept of node metric system for optimizing the throughput of a network, in particular, a shared medium network. The measure of congestion of a path in the network is represented by a path metric which is computed by summing the node metrics of the intermediate nodes on the path. Factors used in computing node metrics include the following: 1. future traffic load from neighboring nodes to the node; and 2. future traffic load from the node to the neighboring nodes.

18 Claims, 7 Drawing Sheets

$$f_A[Q_i(n), BWA_i(n)] = (1-\alpha) \cdot Q_i(n) + \alpha \cdot [\beta \cdot Q_i(n) + (1-\beta) \cdot BWA_i(n)]$$

$$f_B[Q_n(i), BWG_i(n)] = (1-\lambda) \cdot Q_n(i) + \lambda \cdot [\theta \cdot BWG_i(n) + (1-\theta) \cdot Q_n(i)]$$

MULTI-PATH DYNAMIC ROUTING ALGORITHM

CROSS-REFERENCE TO RELATED APPLICATION

This application is a continuation-in-part of prior application Ser. No. 09/589,631, filed Jun. 7, 2000, now abandoned.

TECHNICAL FIELD

The invention relates to a method for improving routing in data networks. In particular, the invention discloses a method for routing data in shared media networks based upon dynamic, algorithmic path metric evaluation.

BACKGROUND ART

Metrics are numbers associated with a telecommunications network that allow comparison of various paths connecting the same pair of source-destination routers. In U.S. Pat. No. 4,905,233 to Cain et al., there is a disclosed use of path metrics for establishing a transmission route between a source node and a destination node in a multinode communications network. The method involves monitoring transmission characteristics of each of the transmission paths among the respective nodes of the network so as to derive a plurality of path metrics representative of the ability of the respective transmission paths of the network to transmit communication signals. Then, feasible transmission routes to be used for the transmission of communication signals from the source node to the destination node are selected as those routes which extend from the source node to the destination node and each of which is comprised of one or more transmission paths among the nodes of the network and the sum of path metrics of transmission paths from neighboring nodes to the destination node is less than the path metric of a transmission path the end nodes of which corresponds to the source and destination nodes. Communication signals are then transmitted from the source node to the destination node over the selected feasible transmission routes.

For a different example, consider FIG. 1 where path comprises a set of links 130 connecting a pair of source-destination routers 120. A designer selects the metrics so that traffic load takes the most efficient path defined by the minimum path metric. Routers 120 can actually evaluate the metric of the entire path connecting a pair of source-destination routers 120. Routing algorithms can compute a metric as a value that applies to an end-to-end path. With this use, metrics allow comparisons of the paths to the same destination router 120. Another use of metrics is to determine the cost associated with outgoing links 130 from a router 120. In many routing algorithms, the end-to-end metric (path metric) is the sum of link metrics.

Prior art routing protocols use different methods of computing the metric. Some, like Routing Information Protocol (RIP), count the hops (number of routers 120 on the path) between the pair of source-destination routers 120. Others have no standard way of computing a metric, making its computation a local choice. Factors used in computing metrics include the following: 1. link bandwidth; 2. link delay; 3. administrative preference, such as monetary cost; 4. link error rate; 5. link utilization. Not all these factors are useful in real networks. In particular, improper use of link utilization in link metrics may create path oscillation. For instance, suppose there is traffic load on Path 1 (not shown) to a destination. Then, Path 2 (not shown) is created and also has connectivity to the same destination. Assume that both Paths 1 and 2 have equal bandwidth. Path 2 becomes more attractive than the more heavily loaded Path 1. Traffic load then migrates to Path 2, making Path 1 less loaded and now more attractive than more heavily loaded Path 2. This leads to the best path choice alternating between Path 1 and Path 2.

Metrics are generally comparable only within the same dynamic routing protocol. RIP uses hop count, whereas IGPR (Interior Gateway Routing Protocol) and EIGPR (Enhanced IGPR) use the same complex formula that, in practice, generally is bandwidth based. OSPF (Open Shortest Path First) use an arbitrary interface cost that, in practice, like IGPR and EIGPR, is bandwidth based.

Consider now the prior art network of FIG. 2, each node 210 in network 200 can communicate with only one of its neighboring nodes 210 at any one time. For instance, assuming Node 4 has a bandwidth of 100 Mbps, the sum of the communication rates (in Mbps) at which Node 4 communicates with its neighboring Nodes 1, 2, 5, and 6 must be 100 Mbps or less. This means that a traffic load from Node 1 to Node 5 via Node 4 affects the bandwidth left for another traffic load from Node 2 to Node 6 via Node 4, and vice versa. Specifically, if Node 4 uses 40 Mbps of its bandwidth to receive packets from Node 2 and another 40 Mbps of it bandwidth to forward the packets to Node 6, it has only 20 Mbps of bandwidth left to handle traffic load from Node 1 to Node 5. It may use 10 Mbps of the remaining bandwidth of 20 Mbps to receive packets from Node 1 and uses the last 10 Mbps of its available bandwidth to forward the packets to Node 5.

For network 200, typical metric assignments of the prior art would have disadvantages. First, a hop count metric does not reflect the merit of the path. For example, assuming Node 4 uses 40 Mbps of its bandwidth of 100 Mbps for receiving packets from Node 2 and uses 40 Mbps for forwarding the packets to Node 6, if Node 1 wants to send a flow at 40 Mbps to Node 5, relying on hop count metrics, it will split the load 50—50 between the two paths via Node 3 and Node 4, assuming load balancing is applicable here. This means that Node 4 uses its last 20 Mbps of bandwidth for receiving packets from Node 1. With input rate at 60 Mbps (40 Mbps from Node 2 and 20 Mbps from Node 1) and output rate at only 40 Mbps (to Node 6), Node 4 has to use a buffer to store packets for later forwarding to Node 5. Soon, the queue in this buffer will overflow and Node 4 has to drop packets. This is called node congestion. Therefore, hop count metrics do not reflect the need for Node 1 to divert its traffic load to Node 3.

Secondly, metric assignments based on link bandwidth also have disadvantages if applied to network 200. Assuming that link 1-4 (connecting Node 1 and Node 4) and link 4-5 (connecting Node 4 and Node 5) have very high bandwidth, and therefore, have low metrics, it follows that the path from Node 1 to Node 5 via Node 4 will be preferred. However, in network 200 of the present invention, Node 4 is the limiting factor, not links 1-4 and 4-5. Typical metrics for links 1-4 and 4-5 will not change and hence path metric for the path including these two links will also not change even when Node 4 runs out of bandwidth handling traffic load from Node 2 to Node 6 via Node 4. As a result, if Node 1 wants to send a flow at 40 Mbps to Node 5, the path via Node 4 is an attractive one, while the path is in fact congested at Node 4.

In patent application Ser. No. 09/187,665, filed Nov. 5, 1998, incorporated by reference, corresponding to published PCT application WO 00/25485, published May 4, 2000, owned by the assignee of the present invention a wireless mesh network is described with reference to FIG. 3, similar to FIG. 1, having fully mutually interconnected, line-of-sight nodes 12–19. All nodes need not be interconnected, so long as a node has line of sight communication with at least one neighbor, with the neighbor being in line of sight communication with the rest of the network on the same basis. Communication between nodes is by packets using a protocol whose basic features are described in patent application Ser. No. 09/328,105, filed Jun. 8, 1999, incorporated by reference herein and owned by the assignee of the present invention. In the protocol described therein, time is broken up into frames of known length. In each frame, every node has scheduled slots with which to exchange control information with each of its neighbor nodes, the slots forming a control channel. Any time a node is not participating in a control channel transmission or reception, it is free to schedule the transmission or reception of data packets. As part of the control channel, requests are made to transmit bits. As part of the request, information about unscheduled periods, i.e. available time or gaps, in the requesting node's data channel is transmitted. The node receiving the requests to transmit (RTS) grants or denies transmissions. Part of the grant includes a schedule, selected from the requester's schedule, for when to transmit the data.

The media access control layer (MAC layer) is the interface between the link layer that generates and consumes the payload data units (PDUs) and the physical layer that is responsible for the actual transmission. The general principle of the MAC protocol is that each pair of neighbors must communicate control information on a regular basis in order to schedule data transmissions. Thus, there is the concept of a frame. During every frame, a node communicates with each of its neighbors making requests to send (RTS) and making grants of clear to send (CTS). The time spent transmitting and receiving this control information is called the control channel. Data transmissions are interwoven throughout the frame, avoiding the control channel. The performance of the MAC scheduling depends on the following factors: (1) the length of the frame, (2) the percent of the frame taken up by the control channel, (3) the efficiency of scheduling data around the control channel, (4) the efficiency of scheduling data transmissions between neighboring nodes. What is needed is a path metric system which takes advantage of fully scheduled transmissions to and from neighboring nodes.

An object of the present invention is to provide a new metric system to better guide the selection of the paths between any pair of source-destination routers given the availability of fully scheduled transmission to and from neighboring nodes.

DISCLOSURE OF THE INVENTION

The present invention achieves the stated object by using a new algorithm for computing a path metric. The status of a path is represented by a path metric which is computed by summing the node metrics of the intermediate nodes on the path based upon future scheduled traffic from and to neighboring nodes. Factors used in computing node metrics include the following: 1. future traffic load from neighboring nodes to the node; and 2. future traffic load from the node to the neighboring nodes. Future traffic load information is communicated between neighbors. The algorithm of the present invention relies upon future scheduled transmitting times from and to other nodes, with schedules that are continuously updated. Communicating nodes reach an agreement on future times available for the exchange of data, allowing instantaneous calculation of node metrics which are summed for alternative paths to determine path selection. Upon calculation of node metrics, path metrics are computed and then traffic is routed considering the metrics in managing the present and future traffic queue to and from each node. This is unlike the prior art where most present or past traffic data is considered, with future data not being the principal factor in path metric calculation. In the present invention node metrics are completely forward looking.

BEST MODE FOR CARRYING OUT THE INVENTION

Figure 3:
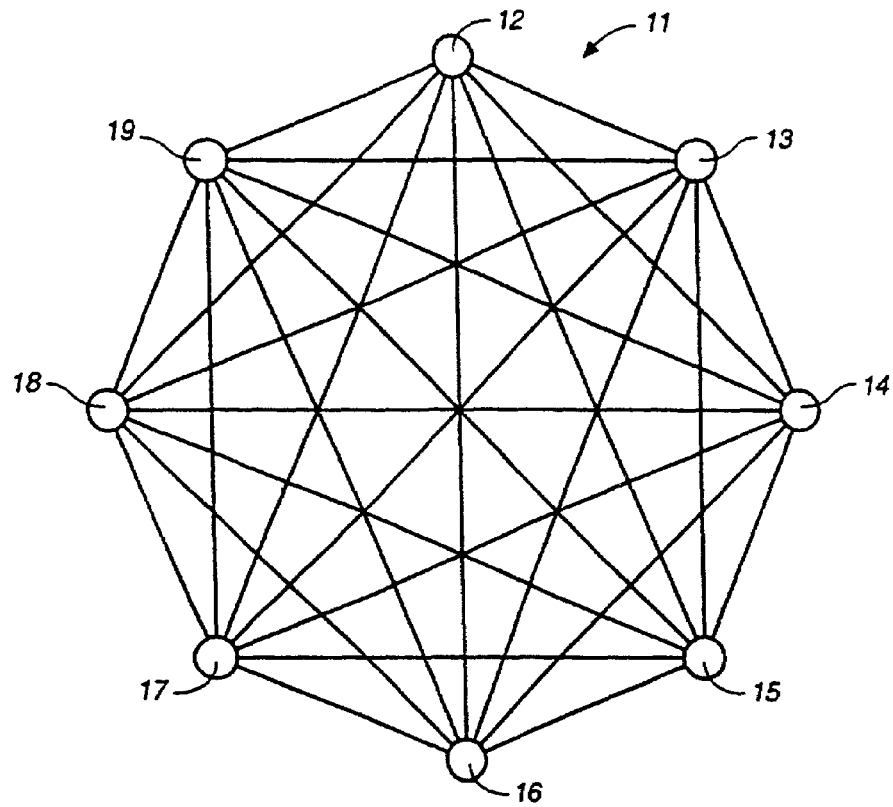
FIG. 3 is a diagram of a fully connected mesh topology network of the prior art.

The following description of a network environment in which the algorithm of the present invention may be employed is taken from U.S. patent application Ser. No. 09/589,631, filed Jun. 7, 2000, owned by the assignee of the present invention. Other networks are possible, so long as the node metrics are based upon future incoming and outgoing traffic. With reference to FIG. 3, a wireless mesh topology network 11 of the prior art is shown having mutually interconnected nodes. In the present invention, all nodes need not be interconnected, so long as a node has line of sight communication with at least one neighbor, with the neighbor being in line of sight communication with the rest of the network on the same basis. Communication between nodes is by packets using a known protocol. The basic features of the protocol are as follows.

Sample Protocol

Time is broken up into frames of known length. In each frame, every node has scheduled slots with which to exchange control information with each of its neighbors, thereby defining a control channel. Any time a node is not participating in a control channel transmission or reception, it is free to schedule the transmission or reception of data packets. As part of the control channel, requests are made to transmit bits. As part of the request, information about unscheduled periods, i.e. available time or gaps, in the requesting node's data channel is transmitted. The node receiving the requests to transmit (RTS) grants or denies transmissions. Part of the grant includes a schedule, selected from the requestor's schedule, for when to transmit the data. Note that the schedule contains schedule information for data exchange to and from neighboring nodes.

The general principle of the communications protocol herein is that each pair of neighbors must communicate control information on a regular basis in order to schedule bidirectional data transmissions. Thus, we have the concept of a frame. During every frame, a node communicates with each of its neighbors making requests to send (RTS) and making grants of clear to send (CTS). The time spent transmitting and receiving this control information is called the control channel. Data transmissions are interwoven throughout the frame, avoiding the control channel. The performance of the media access control ("MAC") scheduling depends on the following factors: (1) the length of the frame, (2) the percent of the frame taken up by the control channel, (3) the efficiency of scheduling data around the control channel, (4) the efficiency of scheduling data transmissions between neighboring nodes.

Within each frame, each node must communicate with each of its neighbors. The basic idea is that a request for transmission is made, accompanied with some information about when a transmission can be made. The potential receiver must then grant all or part or none of the request. With each neighbor, the basic communications that need to occur are:

An RTS message to the neighbor with information about free time in the node's schedule.

A CTS message from the neighbor granting transmission at some mutually agreeable time.

An RTS message from the neighbor with information about the neighbor's unscheduled time.

An CTS message to the neighbor granting transmission at some mutually agreeable time. The above exchange is called a session and is shown in FIG. 4.

Figure 4:
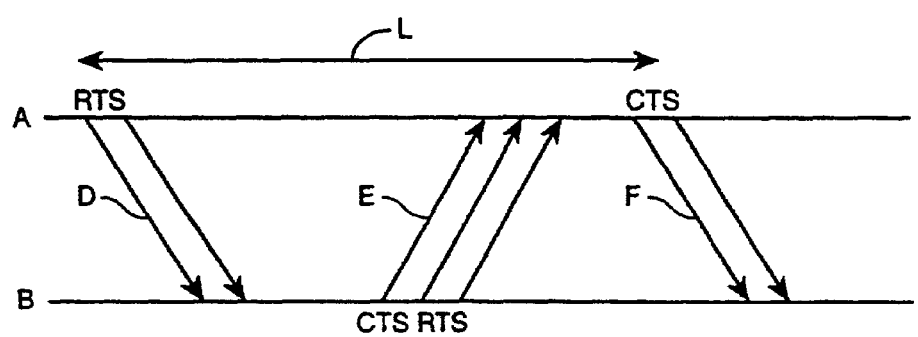
FIG. 4 is a signal session diagram between two nodes showing a data communications protocol employed between neighbors in the network of FIG. 3.

With reference to FIG. 4, the length of the session is indicated by the arrow, L, and is the same for both nodes A and B, indicated by horizontal lines, but it is offset by the propagation delay, indicated by the diagonal arrows D, E. and F. The A node, which is seen to transmit the first RTS to the B node, indicated by the D arrow, is the initiator and carries the schedule of the A node for time available for data. This is followed by a CTS transmission from the B node to the A node with an agreed time. The B node then transmits to the A node an RTS transmission with a schedule of available time for data. Arrow F indicates an acknowledgment by the A node with an agreed time for the transmission of requested data.

Gaps Amidst the Control Channel Data for Data Payload

Figure 5:
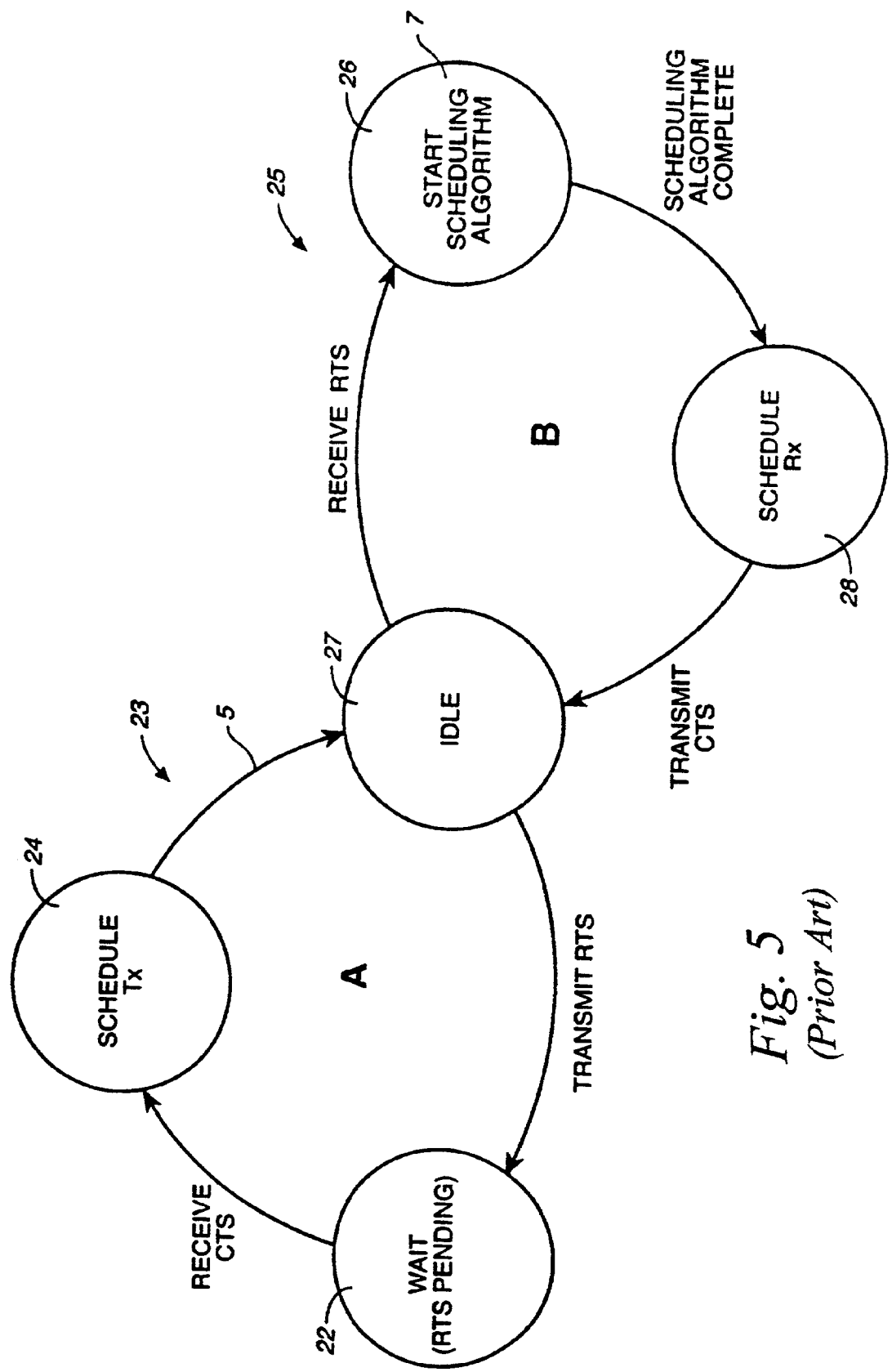
FIG. 5 is a state machine diagram for logic of the control channel illustrated in FIG. 4.

In FIG. 5, the basic state machine for the control channel logic is seen to have two loops 23 and 25 about idle state 27. From an idle state, it will be seen that the A node transmits an RTS message to the B node, indicated by wait state 22 where the RTS schedule is read for acknowledgment with an agree transmission time sent by node B with a CTS message to node A. A transmission is then scheduled by node A as indicated by state 24. Node B also lists available unscheduled gaps with a request to node A, indicated by state 26 wherein node A starts a scheduling algorithm, develops a schedule, indicated by state 28 and transmits a CTS message to node B. This sequence is carried out among all neighbors. The length of the session between node A and node B is the sum of the following:

1. The propagation delay of the RTS message from the initiator A node to the recipient neighbor B node.
2. The transmission delay for the entire RTS packet to arrive.
3. The processing time it takes the neighbor to schedule the RTS.
4. The propagation delay of the CTS message from the neighbor B node back to the initiator A node.
5. The transmission delay for the entire CTS message to arrive.
6. The transmission delay for the entire RTS message to arrive.
7. The processing time it takes the initiator to schedule the neighbor B node's RTS.
8. The transmission delay of transmitting the entire CTS packet. Assuming that the RTS and CTS messages have the same length, the length of the session is: 4 control packet (message) lengths+2propagation delays+2processing times. Every node must have at least one session with each of its neighbors every frame and none of the sessions can be overlapping. The sessions occur on a fixed schedule. This schedule is determined for the entire network by a global scheduling algorithm. It is important to establish a "from neighbor" and a "to neighbor" schedule component for each node. In this algorithm, the following assumptions are made: the topology of the network is known. The propagation delays between neighbors are known. The control packet transmission delays are known. The processing time is constant. A schedule for the sessions of each node in the network is computed and distributed to each node. When the topology of the node changes, for example due to admission or departure of nodes, a new session schedule will need to be computed, propagated to all nodes in the mesh, and implemented at a specified future time.

Every node knows, in addition to its own control channel schedule, its neighbor's control channel schedule. This is true for all neighbors for which there is line of sight communication. It may also know the control channel schedule for other base stations where there can be no communication, but these control channel microslots may be disregarded. During a data transmission to a neighbor, the node must break transmissions in order to maintain its own control channel transmissions and receptions. Similarly, it must break transmission to allow its neighbor to maintain its control channels. The broadcasting node must take into account propagation delays when pausing for a neighbor's control channel. The small time slots used for the control channel are called microslots. It is not required that a node's and its neighbor's RTS and CTS exchanges be back to back, however this is an efficient way to schedule the control channel.

Figure 6A:
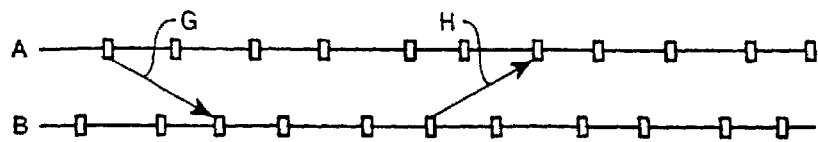
FIGS. 6A and 6B are signal transmission diagrams between two neighboring nodes showing the relation of a plurality of gaps of the kind illustrated in FIG. 4, existing between two nodes.

In FIG. 6A, the horizontal lines A and B indicate two neighbor nodes in a mesh topology network. With reference to FIG. 6A, the control channels or microslots for a node are shown. The timing of the channels is known and broadcast to other nodes. When transmitting to node B, and A node is particularly interested in the microslots of the B node, shown below the microslots of the A node, but on the same time schedule. The downwardly descending arrow, G, indicates the propagation lag of the node B receiver compared to the node A transmitter on RTS. Similarly, the ascending arrow, H, indicates the propagation lag of the node A receiver compared to the node B transmitter on RTS.

Figure 6B:
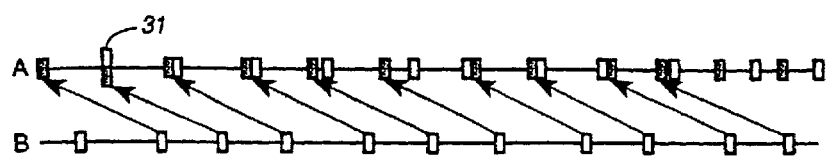

In FIG. 6B, the microslots of node B have been mapped to node A, taking into account propagation delay, since node A must know the microslot schedule of the neighboring node. The dark rectangles on the A node line are the B node control channels. Note that gaps exist between the combined microslots in the A node line. These gaps are available for use by the data channel for transmission from A to B.

Now consider protocols for making a request to send, RTS, to a neighbor. Each node has an opportunity to make an RTS call to a specific neighbor once per frame. The first step is to determine how many bits are queued to be sent to this neighbor that have not yet been scheduled. The full number of bits are requested. Optionally, the request may be limited to a smaller number of bits. A node tracks the times which it has already scheduled to receive or send data. Between these times, there are gaps, and there is an end of schedule time. The node knows the earliest possible time it will receive a CTS from a neighbor. It then selects the first 3 gaps after this time and also the end of schedule time to package into the RTS. The start and stop time of the gaps relative to CTS is what is packaged into the RTS. More or fewer gaps could optionally be selected. Other criteria could be used for selecting gaps to broadcast. When an RTS signal is received (for more than 0 bits), then it is the receiving node's responsibility to make the schedule. The first step is to determine the intersection of the gaps and end of schedule information from the requesting node and gaps in the schedule of the receiving node. The first 3 gaps are kept and the rest discarded. As much of the transmission as possible is scheduled in these gaps, starting with the first gap. If there is extra room, then the last gaps(s) are either shortened or discarded. If the gaps are not long enough, the remaining bits are scheduled at the end of the schedule. This results in a scheduled transmission in at most 4 segments (each segment will be woven around the control channel, possible resulting in further segmentation). Note that the number of bits that can be transmitted in a gap depends on the control channel schedules of the two nodes. The gaps must be identified in the RTS and CTS fields. In the packet format table below, the bits identified as gaps are for address or location information of gaps outside of the control channel where data is to be found within the same frame.

| Control Channel Packet Format Example | |
|---|---|
| RTS message (in a packet) | bits |
| Requested number of bits, in 512 bit increments (0–1024*512, or 0–3.9 msec at 128 Mbps) | 10 |
| Gap 1: [start, stop] offset from end of CTS arrival (0.–4.096 msec, with 1/8 microsec granularity) | 30 |
| Gap 2: [start, stop] offset from end of CTS arrival | 30 |
| Gap 3: [start, stop] offset from end of the CTS arrival | 30 |
| End of Schedule | 15 |
| TOTAL | 115 |

The RTS and CTS packets can be sent even when zero bits are requested or scheduled. This allows for modem synchronization and regular monitoring of neighboring node status.

| Schedule Determination | |
|---|---|
| CTS message (in a packet) | bits |
| Gap 1: [start, stop] offset from end of CTS arrival (0.–4.096 msec, with 1/8 microsec granularity) | 30 |
| Gap 2: [start, stop] offset from end of CTS arrival | 30 |
| Gap 3: [start, stop] offset from end of the CTS arrival | 30 |
| Gap 4: [start, stop] offset from end of CTS arrival | 30 |
| TOTAL | 115 |

The control channel is scheduled so that each node has at least one session per frame with each of its neighbors and is participating in at most one session at any instance in time. Multiple sessions per frame may be used where it is necessary to identify a large number of gaps. The length of the frame determines the minimum frequency at which a node has the opportunity to request and grant transmissions. Thus, frame length impacts the responsiveness of the network and the delays in the network. Shorter frames result in quicker response and shorter delay, but at the cost of decreased data bandwidth. Scheduling in an optimally short frame is in general a complex problem. However, an optimal schedule for control channels is in general not required, nor is it necessarily desirable. A simple algorithm that performs scheduling is as follows:

1. List all sessions that need to be scheduled.
2. Select a session and schedule it as early as possible (either node may be the originator).
3. Repeat step 2 until all sessions are scheduled. The suitability of such a schedule will depend on the network and its desired performance. Shorter schedules can be produced through modifications to the above algorithm or through a variety of alternative algorithms.

Example of Gap Usage With Determined Schedule

Simulations of the following network have been performed: 8 node mesh, as shown in FIG. 3, fully connected nodes randomly placed in a circle with a diameter of 3 km, using a 128 Mbps bandwidth, with all packets having 1024 bits at full traffic load. Each node generates 64*1024 packets/second and each packet's destination is randomly uniformly selected from a node's neighbors with 1 microsecond long microslots and with 10 microseconds of scheduled processing time and a frame length of 378 microseconds (control channel is 7.4%). The minimum transmit time is 1 microsecond in which 4 gaps plus end of schedule are passed in the RTS; five gaps are returned in the CTS. This simulation assumes arbitrary accuracy on gap boundaries and with no limit on how far ahead the gaps are. Also, queue lengths are not limited.

Figure 7:
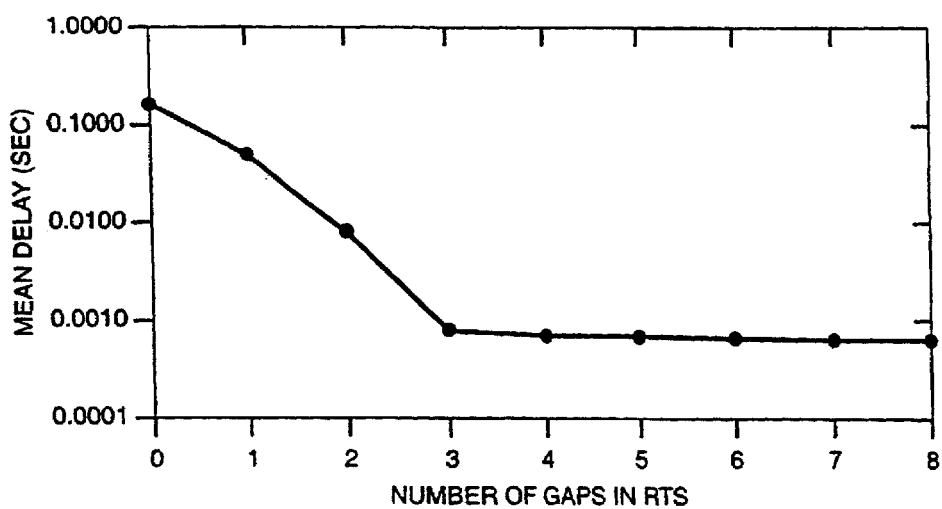
FIG. 7 is a graph of mean delay time versus gaps using the state machine of FIG. 5.

FIG. 7 shows the effect of changing the number of gaps identified in an RTS signal compared with the delay as a function of information passed in the RTS signal at 70% load. By employing at least 3 gaps in the RTS, the mean delay is minimized. There is minimal gain in increasing the number of gaps, although this may be done for redundancy or other reasons. There is always one more gap provided in the CTS signal than in the RTS signal.

Node and Path Metrics of the Present Invention

In accordance with the present invention the node metrics are computed with an algorithm employing scheduled traffic to and from neighboring nodes in a totally predictive manner. This is in contradistinction to the prior art which employed present or past traffic date for metric calculation, with perhaps some predictive considerations. The knowledge of available gaps contained in a schedule at each node enables totally predictive metrics to be computed. After node metrics are established, path metrics are determined. After determining path metrics, traffic loads are allocated.

Before describing the predictive algorithm of the present invention, consider the following example of how a path metric is established and used and how bandwidth is allocated.

Returning to FIG. 2, the metric of the path from Node 1 to Node 5 via Node 4 will be computed by summing the node metrics of all intermediate nodes. Here, Node 4 is the only intermediate node of the path, therefore, its metric is also the path metric of the path. Other methods of combining the node metrics of the intermediate nodes along the path may be used to compute the path metric.

Bandwidth Allocation

The node bandwidth of node 210 is the maximum processing rate of the node 210 in network 200. Because a node 210 can communicate with only one other node 210 at any one time, the bandwidth of the node 210 is shared among its links. Assuming that Node 4 has a bandwidth of 100 Mbps, this bandwidth can be shared among its four links to Nodes 1, 2, 5, and 6. In other words, the sum of traffic rates on the four links of Node 4 must be 100 Mbps or less. In general, let R(i, j) denote the traffic rate on link i-j, then R(4,1)+R(4,2)+R(4,5)+R(4,6)<=100 Mbps, where the symbol <=denotes less than or equal. Similarly, for Node 3, R(3,1)+R(3,5)<=100 Mbps, assuming the maximum bandwidth of Node 3 is 100 Mbps. R(i, j) represents the sum of traffic rates in two directions on the i-j link: from Node i to Node j and from Node j to Node i.

Traffic load on the four links of Node 4 can be input traffic load if the packets are coming to Node 4, or output traffic load if the packets are coming out of Node 4. If input traffic rates exceed output traffic rates, some input packets must be queued in buffer of Node 4. The length of this queue is a component in the computation of Node 4's metric. If output traffic rates exceed input traffic rates, some packets previously stored in the queue are now forwarded to the predetermined destination.

Node Metric Components

The node metric of a node in accordance to the present invention has the following components: a from-neighbor component and a to-neighbor component. The from-neighbor component of the metric of the node reflects the bandwidth of the node needed to handle the data transfer demand from the node's neighboring nodes. If the node's neighbors have big queues of packets to be sent to the node and these neighbors have available bandwidths to send these packets to the node, then the node will have to use much of its bandwidth to receive these packets from the neighbors. In other words, if the queues in the neighbors for packets to be sent to the node grow longer and these neighbors have a lot of available bandwidths to send these packets to the node, the node metric of the node should be increased to show that the node will be busier handling the growing data transfer demand from the node's neighboring nodes.

The to-neighbor component of the metric of the node enabled by the scheduling process described above, reflects the bandwidth of the node needed to handle the data transfer demand from the node to its neighbors. If the node has large queues of packets to be sent to its neighbors, then the node will have to use much of its bandwidth to send these packets to the neighbors. In other words, if the queues in the node for packets to be sent to the neighbors grow longer, the node metric of the node should be increased to show that the node will be busier handling the growing data transfer demand from the node to the neighbors.

Figure 1:
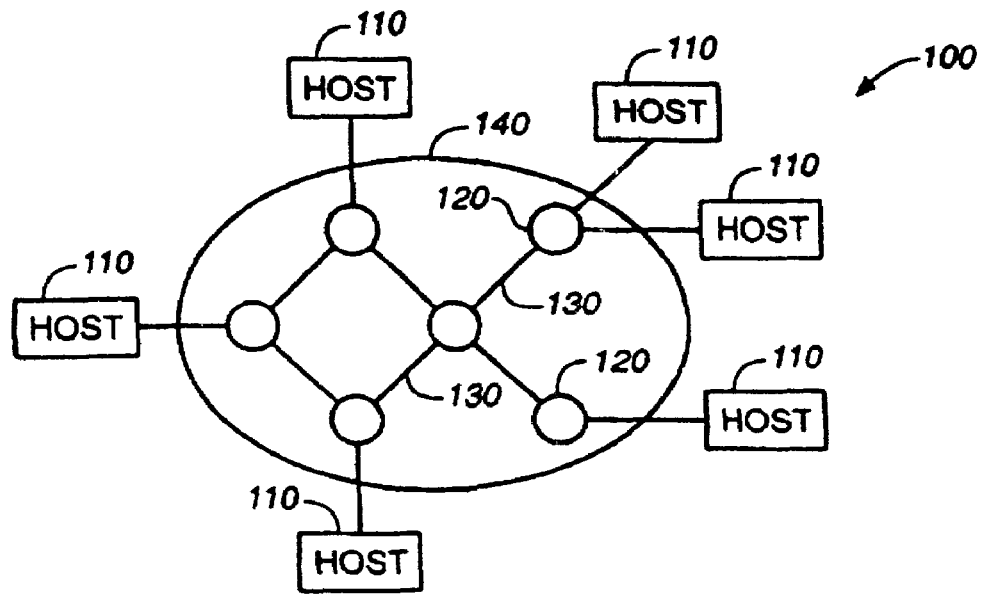
FIG. 1 is a plan of a typical communications network of the prior art.
Figure 2:
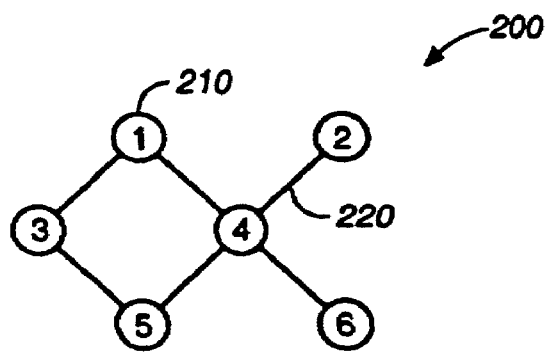
FIG. 2 illustrates hubs and routers in the network of FIG. 1.

Future traffic load on a link of a node is represented by the number of packets to be sent either from the node to the neighbor at the other end of the link (the "to neighbor" component) or from the neighbor to the node (the "from neighbor" component). These packets may be in queue in the node waiting for the neighbor to receive them. These packets may also be in queues in the neighbors waiting for the node to receive them. With reference to FIG. 2, assuming Node 4 is using its entire capacity and then Node 1 has packets to be sent to Node 4, Node 1 has to put these packets in its queue to be sent to Node 4 later when Node 4 has some available bandwidth. The from-neighbor component and the metric of Node 4 should be increased to reflect the effect that some of Node 4's bandwidth will have to be used in the future to empty the queue in Node 1 (i.e., to receive the packets from the queue in Node 1). An exception applies if Node 1 is also busy and will not be able to send the packets from its queue to Node 4 even if Node 4 has available bandwidth to receive them. In this case, the metric of Node 4 should not be increased because the packets in the queue will not be a burden for Node 4 as long as Node 1 has no bandwidth available to send them to Node 4. In other words, either the length of the queue in Node 1 or the bandwidth available for Node 1 to empty the queue is the limiting factor contributing to the metric of Node 4. When one is the limiting factor, it should be in the formula for calculating the node's metric, and the other non-limiting factor should not. However, simulations show that the non-limiting factor should also be present, to a lesser extent, in the formula for calculating the metric of the node. A formula for calculating node metrics is discussed later.

On a periodic basis, say every microsecond, the node metrics are updated (recomputed). The node metric components may be added together to yield the metric for the node or they may be multiplied by a coefficient before adding together, depending on the designer's desired characteristics for the network.

Node metrics have the essential property that if the traffic load on some path increases the node's load, the node's metric will increase. A node can have a high metric that contributes to a path metric of a path even if there is no traffic load on any link of the path. The measure of congestion at each node (node metric), described below, needs to be propagated back towards the source. This is easily done through special routing packets that are sent periodically or through piggybacking the information on other control or data packets.

Node Metric Algorithm

Figure 8:
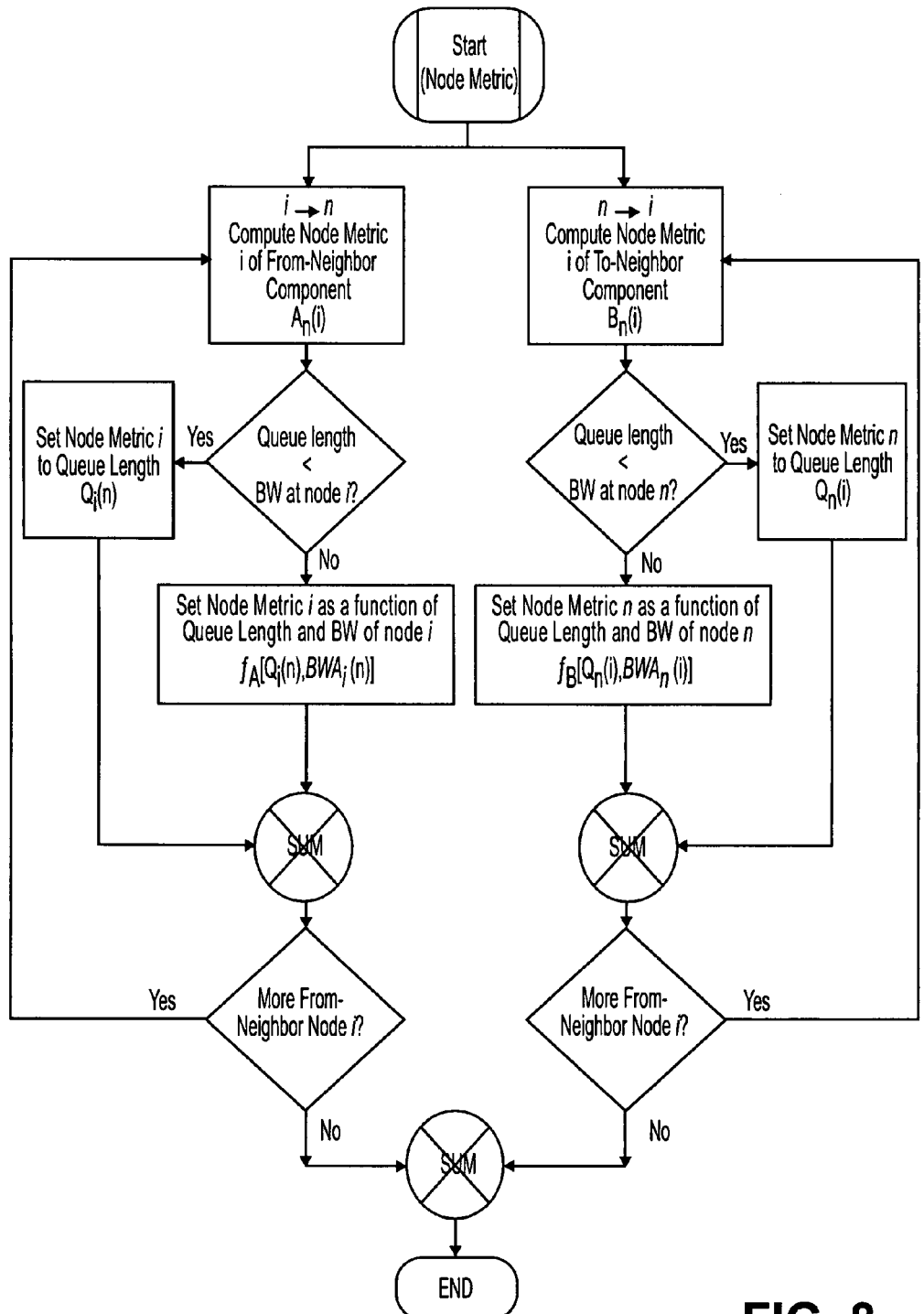
FIG. 8 is a flow diagram of a node metric computation in accordance with the present invention.

The following illustrates the computation of the node metrics using the present invention. Node n computes its own node metric Mn, as shown in FIG. 8, using the formula:

$$M_n = \Sigma_{i \in N} A_n(i) + \Sigma_{i \in N} B_n(i), \quad (1)$$

where
  N is the set of all neighbors of Node n, $$A_n(i) = Q_i(n) \text{ if } Q_i(n) < BWA_i(n), \quad (2a)$$

or $(1-\alpha)*Q_i(n)+\alpha*[\beta*Q_i(n)+(1-\beta)*BWA_i(n)]$, otherwise, (2b)

where $\alpha = BWG_n(i)/BWA_i(n)$, $\beta = BWA_i(n)/BW_i$, $$B_n(i)=Q_n(i) \text{ if } Q_n(i)<BWA_n(i), \quad (3a)$$

or $(1-\lambda)*BWG_i(n)+\lambda*[\theta*BWG_i(n)+(1-\theta)*Q_n(i)]$, otherwise, (3b)

where $$\lambda=BWG_i(n)/BWA_n(i)$$

$$\theta=BWA_n(i)/BW_n,$$

where $Q_i(n)$ is the queue length at Node i for packets to be sent to Node n.

$Q_n(i)$ is the queue length at Node n for packets to be sent to Node i.

$BWA_i(n)$ is the bandwidth available at Node i for sending packets to Node n over a defined period of time. $BWA_i(n)$ represents the numbers of bits that can be transferred from Node i to Node n over a defined period of time. Node i informs Node n about $BWA_i(n)$.

$BWA_n(i)$ is the bandwidth available at Node n for sending packets to Node i over a defined period of time. $BWA_n(i)$ represents the numbers of bits that can be transferred from Node n to Node i over a defined period of time. Node n informs Node i about $BWA_n(i)$.

$BWG_i(n)$ is the bandwidth granted by Node i for receiving packets from Node n over a defined period of time. Node i informs Node n about $BWG_i(n)$ after Node n informs Node i about $BWA_n(i)$.

$BWG_n(i)$ is the bandwidth granted by Node n for receiving packets from Node i over a defined period of time. Node n informs Node i about $BWG_n(i)$ after Node i informs Node n about $BWA_i(n)$.

$BW_n$ is the maximum bandwidth of Node n, i.e., the capacity of Node n.

$BW_i$ is the maximum bandwidth of Node i, i.e., the capacity of Node i.

$\Sigma_{i \in N} A_n(i)$, on the left side of FIG. 8, is the from-neighbor component of the node metric of Node n. $A_n(i)$ reflects the future traffic load on link i-n, from Node i to Node n, that Node n will have to use some or all of its available bandwidth to handle. $A_n(i)$ may depend on at least two variables: $Q_i(n)$ and $BWA_i(n)$. If $Q_i(n)$ is short, i.e., the queue length at Node i for packets to be sent to Node n is short, or in other words, there are not many packets to be sent to Node n, Node n's metric should be low reflecting this good news for any path passing Node n. If $BWA_i(n)$ is small, i.e., the bandwidth available at Node i for sending to Node n is small, Node i can send only a small number of packets to Node n, Node n's metric should be low to reflect this good news for any path passing Node n. Either one of these two terms will be a limiting factor. For example, if Node i is free and, therefore, has much available bandwidth to send packets to Node n, but there are few packets queued in Node i to be sent to Node n, i.e., $Q_i(n)$ is small, then $Q_i(n)$ is the limiting factor and should alone represent $A_n(i)$. In formula (2a) above, this situation corresponds to the condition $Q_i(n)<BWA_n(n)$, therefore, $A_n(i)=Q_i(n)$. Here, $Q_i(n)$ alone represents $A_n(i)$. Conversely, assuming there are a lot of packets queued in Node i to be sent to Node n, i.e., $Q_i(n)$ is large, and Node i has little bandwidth available to send these packets in its queue to Node n, i.e., $BWA_i(n)$ is small, then $BWA_i(n)$ is the limiting factor and should alone represent $A_n(i)$. That is $A_n(i)=BWA_i(n)$ if $Q_i(n)>BWA_i(n)$. However, simulations have shown that formula (2b) works better. Formula (2b) interpolates between $Q_i(n)$ and $BWA_i(n)$. With the assumption above and with formula (2b), $A_n(i)=BWA_i(n)$. This is expected. Specifically, with the assumption above, $BWG_n(i)=BWA_i(n)$, because Node n can easily match/grant the small $BWA_i(n)$, therefore, $\alpha=1$. In addition, $\beta=0$ because $BWA_i(n)$ is small. Therefore, formula (2b) is reduced to $A_n(i)=BWA_i(n)$, which is expected for the condition $Q_i(n)>BWA_1(n)$. In the analysis above, $\alpha$ is near 1 and $\beta$ is near zero, but to simplify the analysis, $\alpha$ and $\beta$ takes the values of 1 and 0, respectively.

$\Sigma_{i \in N} B_n(i)$, on the right side of FIG. 8, is the to-neighbor component of the node metric of Node n. $B_n(i)$ reflects the future traffic load on link n-i, from Node n to Node i, that Node n will have to use some or all of its available bandwidth to handle. $B_n(i)$ may depend on at least two variables: $Q_n(i)$ and $BWA_n(i)$. Assuming $Q_n(i)$ is short, i.e., the queue length at Node n for packets to be sent to Node i is short, or in other words, there are not many packets to be sent to Node i, Node n's metric should be low reflecting this good news for any path passing Node n. Assuming further that Node n is free and, therefore, has much available bandwidth to send packets to Node i, but there are few packets queued in Node n to be sent to Node i, i.e., $Q_n(i)$ is small, then $Q_n(i)$ is the limiting factor and should alone represent $B_n(i)$. In formula (3a) above, this situation corresponds to the condition $Q_n(i)<BWA_n(i)$, therefore, $B_n(i)=Q_n(i)$. Here, $Q_n(i)$ alone represents $B_n(i)$. Conversely, assuming there are a lot of packets queued in Node n to be sent to Node i, i.e., $Q_n(i)$ is large, and Node n has little bandwidth available to send these packets in its queue to Node i, i.e., $BWA_n(i)$ is small, then $BWA_n(i)$ is the limiting factor and should alone represent $B_n(i)$. That is $B_n(i)=BWA_n(i)$ if $Q_n(i)>BWA_n(i)$. However, the fact that $BWA_n(i)$ is small also indicates that Node n is nearly congested, therefore, formula (3b) with interpolation between $Q_n(i)$ and $BWA_n(i)$ better measures the congestion at Node n in relation to the future traffic load from Node n to Node i. Simulations have shown to that effect.

The node metric $M_n$ of Node n can be rewritten as:

$$M_n=\Sigma_{i \in N}[A_n(i)+B_n(i)],$$

where $A_n(i) + B_n(i)$ is the metric contribution corresponding to the node pair n-i including Node n and Node i. After computing all metric contributions, Node n combines them to yield its metric. In the formula above, combines means adds together.

Path Metric Determination

Figure 9:
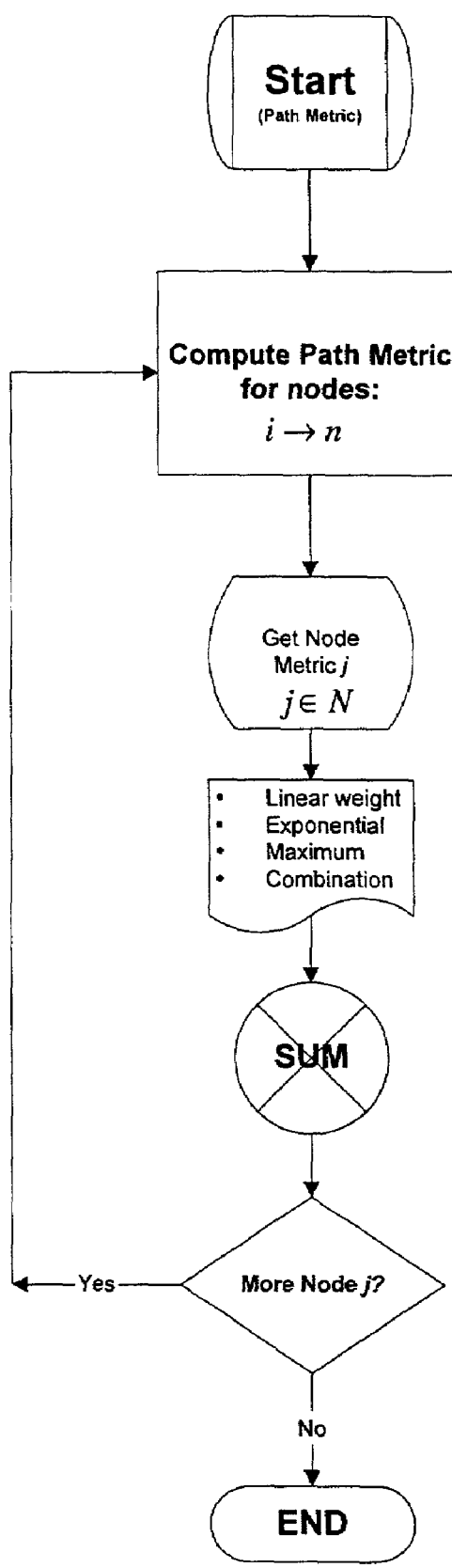
FIG. 9 is a flow diagram of a path metric computation in accordance with the present invention.

With reference to FIG. 9, the congestion of a route represented by the route's path metric is determined by summing the measure of congestion of all the intermediate nodes (node metrics) excluding the source and destination nodes. The congestion of a route (path) can also be determined by weighted sum method, sum of exponential method, maximum method, or their combination. The weighted sum method means each of the node metrics of the nodes on the path excluding the source and destination nodes is multiplied by a coefficient before adding together. Sum of exponential method means each of the node metrics of the nodes on the path excluding the source and destination nodes is raised to some exponential before adding together. Maximum method means the highest node metric among the node metrics of the nodes on the path excluding the source and destination nodes is used as the path metric.

Traffic Allocation

Figure 10:
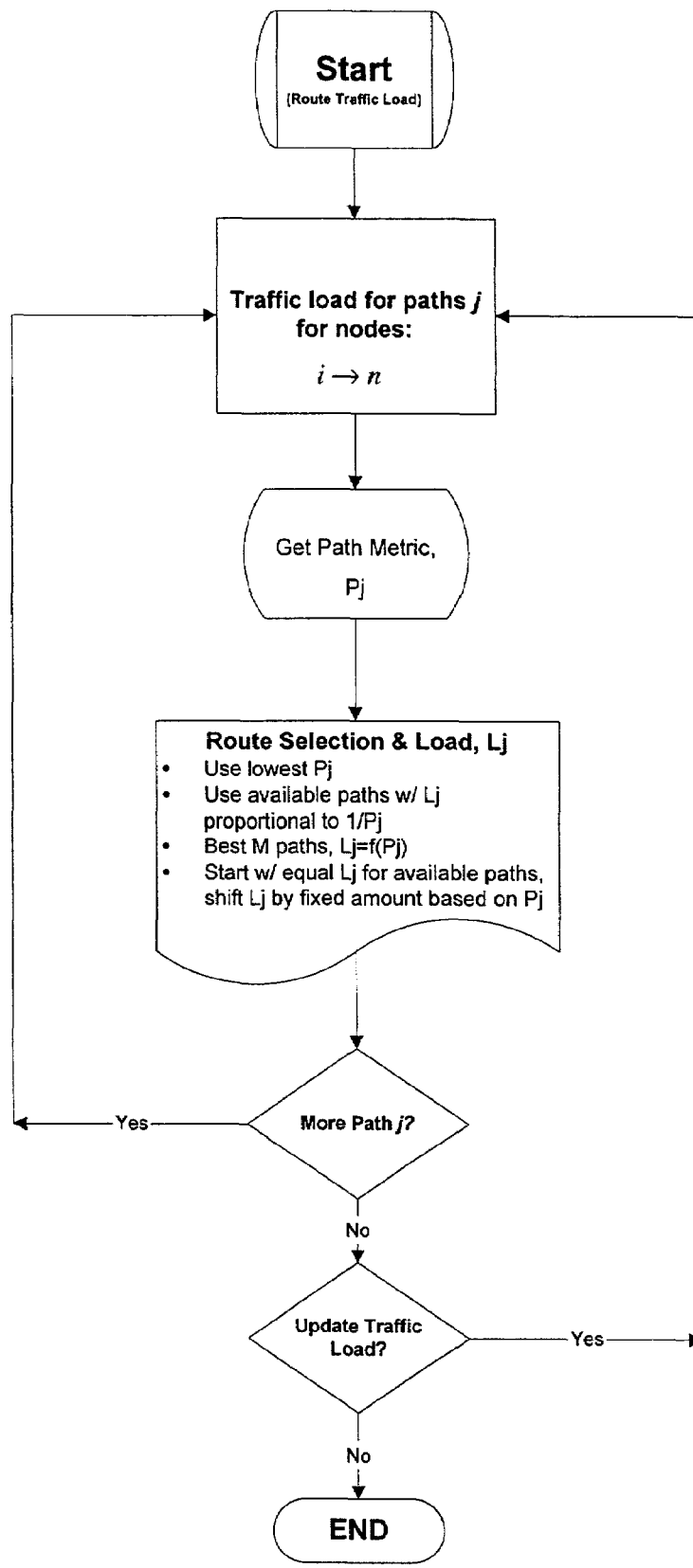
FIG. 10 is a flow diagram of a route traffic allocation in accordance with the present invention using the path metrics of FIG. 9.

After the path metrics of all available paths from the source node to the destination node are available to the source node, the source node can allocate its traffic load to the destination node in the following ways, as shown in FIG. 10.

1. Always use the path having lowest path metric.
2. Use all available paths with the amount of traffic load on each path being inversely proportional to the path metric.
3. Use only the best N paths, where N can be fixed of variable. The allocation of traffic load between these paths can be equal or dependent on the path metrics of these paths.
4. Allocate traffic load equally among the available paths and then shift the load from the most congested paths to the least congested paths. The shift amount may be a fixed amount (in percentage) or dependent on the differences in congestion.

For example, considering FIG. 2 and FIGS. 8–10, assume that each node 210 of network 200 has a maximum bandwidth (capacity) of 120 Mbps. Node 2 generates data to Node 6 via Node 4 at a rate of 54 Mbps, as the result, Node 4 uses 54 Mbps of its 120 Mbps bandwidth for receiving packets from Node 2, and another 54 Mbps for forwarding these packets to Node 6. As a result, Node 4 has only 12 Mbps of its bandwidth left (120-2*54). Now, assuming that, Node 1 starts sending data to Node 5 at a rate of 54 Mbps. There are two available paths for this traffic load. The first path goes through Node 3, and the second path goes through Node 4 (assuming further that no looping is allowed). Initially, the load from Node 1 is to be split 50—50 between the two paths, e.g., the first packet is to be sent to Node 3, the second packet to Node 4, the third packet to Node 3, and so on. This is equivalent to 27 Mbps from Node 1 to Node 4. In other words, Node 1 informs Node 4 about Node 1's bandwidth available of 27 Mbps. But, Node 4 has only 12 Mbps left to receive this. As a result, Node 4 uses all of its remaining 12 Mbps for receiving packets from Node 1. In other words, Node 4 grants only 12 Mbps for receiving packets from Node 1. Node 4 informs Node 1 about the grant and transfer from Node 1 to Node 4 at 12 Mbps starts. As a result, some of the packets from Node 1 intended for Node 4 must be put in a queue in Node 1. There are several events leading to the further increase of Node 4's node metric $M_4$. First, the length $Q_1(4)$ of the queue in Node 1 that holds packets to be sent to Node 4 increases. According to formula (2a), $A_4(1)$, $\Sigma_{i \in N}A_4(i)$, and $M_4$ increase. Second, the length $Q_4(5)$ of the queue in Node 4 that holds packets to be sent to Node 5 increases because Node 4 has no bandwidth left for forwarding packets from Node 1 to Node 5. Formula (3b) applies here because $Q_4(5) > BWA_4(5)$, where $BWA_4(5)=0$. As a result, $B_4(5)=Q_4(5)$, with $\lambda=BWG_5(4)/BWA_4(5)=1$, and $\theta=BWA_4(5)/BW_4=0$. Therefore, when $Q_4(5)$ increases, $B_4(5)$, $\Sigma_{i \in N}B_4(i)$, and $M_4$ increase. All of these events contribute to increase the metric $M_4$ of Node 4 when the metric of Node 4 is updated every micro second. Node 1 promptly realizing the low path metric for the first path and a very high path metric for the second path shifts most of its load to the first path. The increase rate of the metric $M_4$ of Node 4 gets smaller and smaller when traffic rate from Node 1 to Node 4 decreases from 12 Mbps down to 6 Mbps. At this time, Node 4 uses 6 Mbps for forwarding packets from Node 1 to Node 5, the queue in Node 4 for packets from Node 1 to be sent to Node 5 stops growing. However, Node 1 continues to shift load from the second path to the first path. At some point in time, the queue in Node 1 for packets from Node 1 to be sent to Node 4 stops growing and begins shrinking. At steady state, Node 1 sends 89% (48.1 Mbps) through the first path and 11% (5.9 Mbps) through the second path. This results in a total of 119.9 Mbps (54+54+5.9+5.9) which is within the capacity of Node 4.

The node metric system of the present invention does not rely on any particular kind of scheduling or bandwidth allocation, so long as from neighbor and to neighbor components are used. The scheduling algorithm used with the node metric system of the present invention does not have to be capable of dynamic allocation of bandwidth, but is particularly adapted to packet communication. The node metric system of the present invention can be used for networks whose communications are in Time Division Multiple Access (TDMA) mode, Frequency Division Multiple Access (FDMA) mode, or Code Division Multiple Access (CDMA) mode. It should be noted that the physical layer is inconsequential so that the present invention could be used on cable, radio, satellite, fiber or a combination of these.

The node metric system of the present invention, when examining the merit of a path (path metric), takes into account future scheduled traffic loads on other paths that share the same node(s) with the path under examination. Therefore, the node metric system of the present invention has an advantage over prior art link metric systems, especially for wireless mesh topology networks of the type described.

The invention claimed is:

1. A method of routing traffic from a source node to a destination node in a mesh topology network connected to a plurality of hosts, said network having a plurality of nodes that are routers, including source node and destination node and a plurality of links connecting said nodes, the method comprising:
   calculating a from-neighbor component of a node metric for a node, said from-neighbor component reflecting the future traffic load from a plurality of neighbors of said node to said node;
   calculating a to-neighbor component of said node metric for a node, said to-neighbor component reflecting the future traffic load from said node to said plurality of neighbors; and
   combining said from-neighbor component with said to-neighbor component to yield said node metric;
   determining a path metric for each path of a plurality of paths from source node to destination node; and
   allocating the load from source node to destination node to said plurality of paths according to the path metric of each path of said plurality of paths.

2. The method of claim 1 wherein said calculating a from-neighbor component of said node metric comprises:
   determining a first future traffic load for each link of a first plurality of links of said node; and
   combining the first future traffic load of said first plurality of links of said node to yield said from-neighbor component of said node metric.

3. The method of claim 1 wherein said calculating a to-neighbor component of said node metric comprises:
   determining a second future traffic load for each link of a second plurality of links of said node; and
   combining the second future traffic load of said second plurality of links of said node to yield said to-neighbor component of said node metric.

4. The method of claim 2 wherein said determining a first future traffic load for each link of a first plurality of links of said node comprises:
   determining the length of a first queue in a first neighbor at the other end of said link, said first queue storing the packets to be sent to said node;
   determining the available bandwidth of said first neighbor for sending data to said node; and analyzing said length of said first queue and said available bandwidth of said first neighbor to yield said first future traffic load for said link.

5. The method of claim 2 wherein said calculating a to-neighbor component of said node metric comprises:
determining a second future traffic load for each link of a second plurality of links of said node; and
combining the second future traffic load of said second plurality of links of said node to yield said to-neighbor component of said node metric.

6. The method of claim 4 wherein said analyzing also takes into account a bandwidth granted by said node to said first neighbor.

7. The method of claim 4 wherein said analyzing comprises using an interpolation method.

8. The method of claim 3 wherein said determining a second future traffic load for each link of a second plurality of links of said node comprises:
determining the length of a second queue in said node, said second queue storing the packets to be sent to a second neighbor being at the other end of said link;
determining the available bandwidth of said node for sending data to said second neighbor; and
analyzing the length of said second queue and said available bandwidth of said node to yield said second future traffic load for said link.

9. The method of claim 8 wherein said analyzing also takes into account a bandwidth granted by said node to said second neighbor.

10. The method of claim 8 wherein said analyzing comprises using an interpolation method.

11. A method of routing a traffic load from a source node to a destination node in a mesh topology network connected to a plurality of hosts, said network having a plurality of nodes that are routers, including source node and destination node and a plurality of links connecting said nodes, the method comprising:
computing a node metric for a node by determining a first future traffic load for a link from a neighbor being at the other end of said link to said node,
determining a second future traffic load for said link from said node to said neighbor, and
combining said first future traffic load and said second future traffic load to yield a metric contribution for said link;
accounting for future scheduled traffic to and from the node in each link, and combining said metric contributions of said first plurality of links to yield said node metric;
determining a path metric for each path of a plurality of paths from source node to destination node; and
allocating the load from source node to destination node to said plurality of paths according to the path metric of each path of said plurality of paths.

12. The method of claim 11 wherein said determining a first future traffic load comprises:
determining the length of a first queue in said neighbor, said first queue storing the packets to be sent to said node;
determining the available bandwidth of said neighbor for sending data to said node; and
analyzing said length of said first queue and said available bandwidth of said neighbor to yield said first future traffic load for said link.

13. The method of claim 12 wherein said determining said second future traffic load comprises:
determining the length of a second queue in said node, said second queue storing the packets to be sent to a said neighbor;
determining the available bandwidth of said node for sending data to said neighbor; and
analyzing the length of said second queue and said available bandwidth of said node to yield said second future traffic load for said link.

14. The method of claim 12 wherein said analyzing also takes into account a bandwidth granted by said node to said neighbor.

15. The method of claim 12 wherein said analyzing comprises using an interpolation method.

16. The method of claim 12 wherein said determining said second future traffic load comprises:
determining the length of a second queue in said node, said second queue storing the packets to be sent to a said neighbor;
determining the available bandwidth of said node for sending data to said neighbor; and
analyzing the length of said second queue and said available bandwidth of said node to yield said second future traffic load for said link.

17. The method of claim 13 wherein said analyzing also takes into account a bandwidth granted by said neighbor to said node.

18. The method of claim 13 wherein said analyzing comprises using an interpolation method.

* * * * *